United States Patent [19]

Eichenauer et al.

[11] Patent Number: 4,652,614

[45] Date of Patent: * Mar. 24, 1987

[54] MAT MOULDING MATERIALS

[75] Inventors: Herbert Eichenauer, Dormagen; Joachim Döring, Cologne; Karl-Heinz Ott, Leverkusen; Ludwig Bottenbruch, Krefeld, all of Fed. Rep. of Germany

[73] Assignee: Bayer Aktiengesellschaft, Leverkusen, Fed. Rep. of Germany

[*] Notice: The portion of the term of this patent subsequent to Dec. 24, 2002 has been disclaimed.

[21] Appl. No.: 702,244

[22] Filed: Feb. 15, 1985

[30] Foreign Application Priority Data

Feb. 27, 1984 [DE] Fed. Rep. of Germany ....... 3407018

[51] Int. Cl.$^4$ .................. C08L 51/04; C08L 51/06
[52] U.S. Cl. .................................. 525/71; 525/73; 525/77
[58] Field of Search ........................... 525/71, 73, 77

[56] References Cited

U.S. PATENT DOCUMENTS 4,560,726 12/1985 Eichenauer et al. ............... 525/71

Primary Examiner—Jacob Ziegler
Attorney, Agent, or Firm—Connolly & Hutz

[57] ABSTRACT

The invention relates to moulding materials which have a mat surface and are based on neutral and acid graft polymers.

13 Claims, No Drawings

MAT MOULDING MATERIALS

The invention relates to moulding materials which have a mat surface and are based on neutral and acid graft polymers.

Polymer blends with elastic-thermoplastic properties and a mat surface are of growing interest for fields of application in which high toughness and at the same time low gloss are required, thus, for example, for components for automobile interiors or for equipment coverings.

Attempts have hitherto been made to prepare such polymer blends by using large particles of rubber (compare, for example, U.S. Pat. No. 4,169,869) or using rubbers which are not crosslinked or only slightly crosslinked (compare, for example, DE-OS (German Published Specification) No. 2,057,936) as the graft base of the graft polymers.

In all these attempts, however, the desired nature of the surface has been achieved with the loss of product qualities which are similarly desirable, such as, for example, notched impact strength, hardness or processability.

The invention relates to mat moulding materials of (A) 99.95 to 0.05% by weight, preferably 70 to 30% by weight, of a graft product of a mixture of 40 to 100 parts by weight of styrene, α-methylstyrene, p-methylstyrene, vinyltoluene, methyl methacrylate or mixtures thereof and 60 to 0 parts by weight of acrylonitrile on a rubber in particle form with an average particle diameter ($d_{50}$) of 0.05 to 20.0 μm and a glass transition temperature of $\leq 10°$ C., with a total rubber content of 5 to 80% by weight and (B) 0.05 to 99.95% by weight, preferably 30 to 70% by weight, of a graft product of a mixture of 40 to 99.9 parts by weight of styrene, α-methylstyrene, p-methylstyrene, vinyltoluene, methyl methacrylate or mixtures thereof, 40 to 0.1 parts by weight of a monoacid or diacid containing a polymerisable double bond and 0 to 49 parts by weight of acrylonitrile on a rubber in particle form with an average particle diameter ($d_{50}$) of 0.05 to 20.0 μm and a glass transition temperature of $\leq 10°$ C., with a total rubber content of 5 to 80% by weight.

Virtually all the rubbers with glass transition temperatures of $\leq 10°$ C. are suitable as the graft base for graft products (A) and (B). Examples are polybutadiene, polyisoprene, styrene/butadiene copolymers, acrylonitrile/butadiene copolymers, acrylate rubbers, EPM rubbers (ethylene/propylene rubbers) and EPDM rubbers (ethylene/propylene/diene rubbers which contain a small amount of conjugated diene, such as, for example, hexa-1,5-diene or norbornadiene, as the diene).

These rubbers must be in the form of particles with an average diameter ($d_{50}$) of 0.05 to 20.0 μm, preferably 0.1 to 2.0 μm and particularly preferably 0.1 to 0.8 μm.

The graft products (A) and (B) are prepared in a manner which is known per se by grafting polymerisation in emulsion, suspension or solution or by a combination of these processes.

They contain 5 to 80% by weight of rubber, in particular 20 to 60% by weight, and have gel contents, measured in acetone at 25° C., of 30 to 90% by weight, in particular 40 to 80% by weight.

Suitable grafting monomers are, for example, styrene, α-methylstyrene, p-methylstyrene, vinyltoluene, acrylonitrile, methacrylonitrile, methyl methacrylate, vinyl acetate or mixtures thereof, in particular mixtures of acrylonitrile and styrene.

Whilst the graft product (A) is prepared by polymerisation of these monomers in the presence of diene or acrylate rubbers, the graft product (B) is also prepared using the abovementioned monomers in the presence of the diene or acrylate rubbers, but a polymerisable monoacid or diacid, for example acrylic acid, methacrylic acid, maleic acid, fumaric acid, itaconic acid, crotonic acid, cinnamic acid, vinylsulphonic acid, vinylbenzenesulphonic acid or mixtures thereof, is required as a further monomer component, aliphatic $C_3$–$C_{10}$- or aromatic $C_9$–$C_{18}$-mono- or di-carboxylic acids being preferred.

The moulding materials according to the invention can be obtained by mixing their constituents (A) and (B) with one another at elevated temperatures, in particular at 100° C. to 280° C., for example in kneaders, on roll mills or in screw machines.

If (A) and (B) are obtained as dispersions, suspensions or solutions, these can be mixed and worked up together.

The customary amounts of the usual additives, such as antioxidants, anti-ageing agents, lubricants, flameproofing agents, fillers, pigments and antistatics, can be added to the moulding materials.

The blends according to the invention are mat flexible thermoplastic moulding materials with good flow properties during processing by extrusion, calendering and injection-moulding. They can be processed to mat moulded articles, but are also suitable as modifiers for other plastics, in particular for thermoplastics, such as acrylonitrile/butadiene/styrene terpolymers (ABS), methyl methacrylate/butadiene/styrene terpolymers (MBS), styrene/acrylonitrile copolymers (SAN), α-methylstyrene/acrylonitrile copolymers, polystyrene, high impact polystyrene (HIPS), polymethyl methacrylate, polyvinyl chloride, polycarbonate, polycarbonate/ABS mixtures, polyphenylene oxide, polyphenylene oxide/HIPS mixtures, polyamides, for example polyamide 6 and polyamide 66, and polyesters, for example polyethylene terephthalate and polybutylene terephthalate. Those mixtures according to the invention which contain a large amount of rubber—for example 50 to 70% by weight—are preferably used as "matting modifiers". They are generally used in an amount of 5 to 40% by weight, based on the total modified product.

A preferred mixture of this type consists of 10 to 80% by weight of the mat polymer blend according to the invention, and 90 to 20% by weight of a thermoplastic resin consisting of 5 to 40 parts by weight of styrene, α-methylstyrene, p-methylstyrene, methyl methacrylate or mixtures thereof and 0 to 70% by weight of an aromatic polycarbonate.

EXAMPLES AND COMPARISON EXAMPLES

The following examples illustrate the invention. Parts are parts by weight and always relate to solid constituents or polymerisable constituents.

PREPARATION OF THE GRAFT PRODUCTS

G parts of rubber base (in the form of a Latex with a solids content of between 35 and 50% by weight) are warmed to 65° C. in a reactor, after which 0.5 part of potassium persulphate (dissolved in 20 parts of water) is added. M parts of the monomer mixture stated in Table 1 and 2 parts of the emulsifier given in Table 1 (dissolved in 25 parts of water) are then metered in over a period of 4 hours, during which the grafting reaction takes place. After an after-reaction time, the graft latex is coagulated in an aqueous magnesium sulphate/acetic acid solution, after addition of 1.2 parts of antioxidant. The resulting powder is washed with water and dried at 70° C. in vacuo.

wide and about 2 mm thick (units: cm). The gloss was measured in accordance with DIN 67,530 on a flat sheet at a reflection angle of 60° (reflectometer value) with the aid of a "Multi-Gloss" multiangle reflectometer from Byk-Mallinckrodt (see Table 2).

The thermoplastic resins used are: styrene/acrylonitrile (SAN)=72.28 copolymer with an $M_w$ of about 80,000 α-methylstyrene/acrylonitrile (AMSAN)=69:31 copolymer with an $M_w$ of about 75,000, bisphenol A polycarbonate (PC) with an $M_w$ of about 30,000; all the resins have an $(M_w/M_n)-1 \leq 2.0$.

TABLE 1

| Graft product | Graft product type | Rubber base | Average particle size | G | Monomer | M | Emulsifier |
|---|---|---|---|---|---|---|---|
| 1 | A | polybutadiene latex | 0.4 μm | 50 | 72 styrene 28 acrylonitrile | 50 | sodium salt of disproportionated abietic acid |
| 2 | A | polybutadiene latex | 0.4 μm | 80 | 72 styrene 28 acrylonitrile | 20 | sodium salt of disproportionated abietic acid |
| 3 | A | polybutyl acrylate latex | 0.5 μm | 50 | 72 styrene 28 acrylonitrile | 50 | sodium salt of disproportionated abietic acid |
| 4 | B | polybutadiene latex | 0.4 μm | 50 | 65 styrene 25 acrylonitrile 10 methacrylic acid | 50 | sodium salt of $C_{9-18}$—alkyl-sulphonic acids |
| 5 | B | polybutadiene latex | 0.4 μm | 60 | 55 styrene 15 acrylonitrile 10 methyl methacrylate 20 acrylic acid | 40 | sodium salt of $C_{9-18}$—alkyl-sulphonic acids |
| 6 | B | polybutyl acrylate latex | 0.5 μm | 50 | 61 styrene 24 acrylonitrile 15 methacrylic acid | 50 | sodium salt of $C_{9-18}$—alkyl-sulphonic acids |
| 7 | B | polybutadiene latex | 0.4 μm | 65 | 58 styrene 22 acrylonitrile 20 methacrylic acid | 35 | sodium salt of $C_{9-18}$—alkyl-sulphonic acids |

PREPARATION AND TESTING OF THE MOULDING MATERIALS

P parts of a mixture of graft product A and graft product B in the weight ratio stated in Table 2 are mixed with H parts of a thermoplastic resin and 3 parts of a lubricant in a kneader and the mixtures are then injection-moulded to standard test bars, a sheet (for evaluation of the surface) and a helix (for evaluation of the flow distance). Part of the material was processed to sheets by extrusion. The notched impact strength was measured at room temperature ($a_k^{RT}$) and at −40° C. ($a_k^{-40°\,C.}$) in accordance with DIN 53,453 (units: kJ/m²), the ball indentation hardness ($H_c$) was measured in accordance with DIN 53,456 (units: N/mm²), the heat distortion point (Vicat B) was measured in accordance with DIN 53,460 (units: °C.) and the flow distance was measured at 220° C. on a helix about 8 mm

TABLE 2

| Moulding material | Graft product | Weight ratio | P parts | Thermo-plastic resin | H parts | $a_k^{RT}$ | $a_k^{-40°C}$ | $H_c$ | Vicat B | Flow distance | Reflecto-meter value | Appearance of the extruded sheet |
|---|---|---|---|---|---|---|---|---|---|---|---|---|
| 1 (Comparison) | 1 | | 40 | SAN | 60 | 16 | 11 | 86 | 97 | 41 | 78 | glossy |
| 2 (Comparison) | 2 | | 30 | SAN | 70 | 18.5 | 12 | 79 | 91 | 38 | 66 | glossy |
| 3 (Comparison) | 3 | | 40 | SAN | 60 | 15 | 5 | 85 | 95 | 40 | 80 | glossy |
| 4 (Comparison) | 4 | | 40 | SAN | 60 | 12 | 7 | 87 | 98 | 34 | 25 | mat |
| 5 | 1 + 4 | 1:1 | 40 | SAN | 60 | 14 | 9 | 88 | 99 | 38 | 25 | mat |
| 6 | 2 + 5 | 2:1 | 30 | SAN | 70 | 14.5 | 8 | 85 | 96 | 38 | 19 | mat |
| 7 | 3 + 6 | 1:1 | 40 | SAN | 60 | 15 | 4.5 | 86 | 96 | 39 | 27 | mat |
| 8 | 1 + 7 | 3:2 | 30 | AMSAN | 70 | 12.5 | 6 | 90 | 104 | 31 | 11 | mat |
| 9 | 1 + 4 | 1:1 | 35 | AMSAN | 65 | 13 | 6 | 89 | 103 | 31 | 18 | mat |
| 10 | 1 + 4 | 1:1 | 35 | PC/SAN = 2:1-mixture | 65 | 22 | 7.5 | 80 | 110 | 23 | 25 | mat |

As can be seen from Table 2, the incorporation of a graft product A by itself (moulding materials 1 to 3) into a thermoplastic matrix does not lead to a mat surface. Although a matted surface can be observed after mixing the graft product B by itself with the thermoplastic resin, a decrease in the notched impact strength and a reduced flowability at the same time occur (moulding material 4). Only when the mixtures according to the invention of graft product A and graft product B are used in a thermoplastic resin matrix (moulding materials 5 to 10) is a mat surface obtained, without an adverse influence on the other properties, on processing both by extrusion and by injection-moulding.

We claim:

1. A mixture of
   (A) 99.95 to 0.05% by weight, of a graft product of a mixture of 40 to 100 parts by weight of a first grafting monomer and 60 to 0 parts by weight of acrylonitrile on particulate rubber, and
   (B) 0.05 to 99.95% by weight of a graft product of a mixture of 40 to 99.9 parts by weight of a first grafting monomer, 40 to 0.1 parts by weight of a monoacid or diacid containing a polymerisable double bond, and 0 to 49 parts by weight of acrylonitrile on particulate rubber,
   wherein said first grafting monomer is selected from styrene, α-methylstyrene, p-methylstyrene, vinyltoluene, methyl methacrylate and mixtures thereof and wherein said particulate rubber is a rubber in particle form with an average particle diameter ($d_{50}$) of 0.05 to 20.0 μm and a glass transition temperature of $\leq 10°$ C., and a total rubber content of 5 to 80% by weight in both component (A) and component (B).

2. A mixture according to claim 1 of 70 to 30% by weight of the graft product of component (A) and 30 to 70% by weight of the graft product of component (B).

3. A mixture according to claim 2 of 65 to 35% by weight of the graft product of component (A) and 35 to 65% by weight of the graft product of component (B).

4. A mixture according to claim 2 or 3, in which component (A) consists of a graft product of a mixture of
   60 to 90 parts by weight of the first grafting monomer and
   40 to 10 parts by weight of acrylonitrile on the particulate rubber, and
   component (B) consists of a graft product of a mixture of
   60 to 85 parts by weight of the first grafting monomer,
   30 to 5 parts by weight of the mono- or diacid, and 10 to 40 parts by weight of acrylonitrile on the particulate rubber,
   wherein the particulate rubber has an average particle diameter ($d_{50}$) of 0.1 to 1.0 μm and provides a total rubber content of 30 to 70% by weight in both component (A) and component (B).

5. A mixture according to claim 4 in which the mono- or diacid of component (B) is an aliphatic $C_3$–$C_{10}$- or aromatic $C_9$–$C_{18}$-mono- or dicarboxylic acid.

6. A mixture according to claim 5 in which the mono- or diacid of component (B) is acrylic acid or methacrylic acid.

7. A mixture of
   (A) 99.5 to 0.05% by weight, of a graft product of a mixture of 40 to 100 parts by weight of a first grafting monomer and 60 to 0 parts by weight of acrylonitrile on particulate rubber, and
   (B) 0.05 to 99.95% by weight of a graft product of a mixture of 40 to 99.9 parts by weight of a first grafting monomer, 40 to 0.1 parts by weight of a $C_3$ to $C_{10}$ aliphatic or $C_9$ to $C_{18}$ aromatic carboxylic acid either of which is a monoacid or diacid containing a polymerizable double bond, and 0 to 49 parts by weight of acrylonitrile on particulate rubber,
   wherein said first grafting monomer is selected from styrene, α-methylstyrene, p-methylstyrene, vinyltoluene, methyl methacrylate and mixtures thereof and wherein said particulate rubber is a rubber in particle form with an average particle diameter ($d_{50}$) of 0.05 to 20.0 μm and a glass transition temperature of $\leq 10°$ C., and a total rubber content of 5 to 80% by weight in both component (A) and component (B).

8. A mixture according to claim 7 of 70 to 30% by weight of the graft product of component (A) and 30 to 70% by weight of the graft product of component (B).

9. A mixture according to claim 8 of 65 to 35% by weight of the graft product of component (A) and 35 to 65% by weight of the graft product of component (B).

10. A mixture of
    (A) 99.95 to 0.05% by weight, of a graft product of a mixture of 40 to 100 parts by weight of a first grafting monomer and 60 to 0 parts by weight of acrylonitrile on particulate rubber, and
    (B) 0.05 to 99.95% by weight of a graft product of a mixture of 40 to 99.9 parts by weight of a first grafting monomer, 40 to 0.1 parts by weight of acrylic acid or methacrylic acid, and 0 to 49 parts by weight of acrylonitrile on particulate rubber,
    wherein said first grafting monomer is selected from styrene, α-methylstyrene, p-methylstyrene, vinyltoluene, methyl methacrylate and mixtures thereof and wherein said particulate rubber is a rubber in particle form with an average particle diameter ($d_{50}$) of 0.05 to 20.0 μm and a glass transition temperature of $\leq 10°$ C., and a total rubber content of 5 to 80% by weight in both component (A) and component (B).

11. A mixture according to claim 1 or claim 2 or claim 3 or claim 7 or claim 10 in which the particulate rubber has an average particle diameter ($d_{50}$) of 0.1 to 0.8 μm.

12. A mixture according to claim 1 or claim 2 or claim 3 or claim 7 or claim 10 in which the particulate rubber provides a total rubber content of 20 to 60% in both component (A) and component (B).

13. A mixture according to claim 11 in which the particulate rubber provides a total rubber content of 20 to 60% in both component (A) and component (B).

* * * * *